(12) United States Patent
Feng

(10) Patent No.: US 11,835,478 B2
(45) Date of Patent: Dec. 5, 2023

(54) METHOD FOR MEASURING THE TRANSIENT THERMAL DIFFUSION PERFORMANCE OF A HEAT DISSIPATION MODULE

(71) Applicant: Long Victory Instruments Co., Ltd., Taoyuan (TW)

(72) Inventor: Chien-Chung Feng, Taoyuan (TW)

(73) Assignee: LONG VICTORY INSTRUMENTS CO., LTD., Taoyuan (TW)

( * ) Notice: Subject to any disclaimer, the term of this patent is extended or adjusted under 35 U.S.C. 154(b) by 123 days.

(21) Appl. No.: 17/388,523

(22) Filed: Jul. 29, 2021

(65) Prior Publication Data

US 2023/0046672 A1 Feb. 16, 2023

(51) Int. Cl.
*G01N 25/18* (2006.01)
(52) U.S. Cl.
CPC ................................ *G01N 25/18* (2013.01)
(58) Field of Classification Search
USPC .......................................................... 374/43
See application file for complete search history.

(56) References Cited

U.S. PATENT DOCUMENTS

| 5,080,495 A | * | 1/1992 | Hashimoto | ............ | G01N 25/18 |
| | | | | | 374/119 |
| 11,346,796 B2 | * | 5/2022 | Feng | ..................... | G01N 25/18 |

* cited by examiner

*Primary Examiner* — Mirellys Jagan
(74) *Attorney, Agent, or Firm* — WPAT, P.C.

(57) ABSTRACT

A method to measure the transient thermal diffusivity performance of a heat dissipation module by selecting two measurement points on the surface of the heat dissipation module, and locating the two measurement points at the same side of the thermal center point but different distances, and measuring the temperature of the two measurement points separately and using first equation which is the analytical solution of the energy equation. After calculating the first equation, second and third equations are used to find M. The distance X1 between M and the first measurement point and temperature T1 at a moment of transient state are also inserted into the first equation to obtain the value of the thermal diffusivity coefficient $\alpha$, which represents the transient thermal diffusivity performance for the heat dissipation module.

5 Claims, 5 Drawing Sheets

METHOD FOR MEASURING THE TRANSIENT THERMAL DIFFUSION PERFORMANCE OF A HEAT DISSIPATION MODULE

FIELD OF THE DISCLOSURE

The present disclosure relates in general to a method of measuring thermal diffusion performance, and in particular, to a method of measuring the transient thermal diffusion performance of a heat dissipation module.

BACKGROUND OF THE DISCLOSURE

A thermal or heat dissipation module is a device widely used in computers or heat generating chip modules (e.g., LED light boards). Most of the known heat dissipation modules are equipped with a metal base plate (aluminum or copper) that has one or more heat dissipation fins located on top or integrated in one piece. The metal base plate is affixed to a heat source to provide the heat source with a way to conduct heat dissipation sideways or upward through the heat dissipation fins.

The conventional way of using a metal base plate as a heat dissipation module by attaching such to a heat source is considered useful when the heat energy of the heat source is not relatively high, but nowadays, the CPU (central processing unit) or LED light board is getting more and more advanced and sophisticated, and therefore the heat energy generated per unit time is getting larger, meaning that the speed of heat conduction by the metal base plate is no longer sufficient. To improve on the heat dissipation module, one had proposed placing a uniform heat conduction plate (Vapor Chamber) under the metal base plate connected to the heat source.

The present practice has embraced the concept of combining the uniform temperature heat conduction plate with the heat dissipation module to enhance the heat dissipation function. However, any expected enhancement in terms of faster or better thermal diffusion performance for the heat dissipation module in the present practice is still theoretical in that there is no specific and data-based measurement technology, and that presently only a long-term measurement of the instrument can be used to obtain the observed results.

SUMMARY OF THE DISCLOSURE

It is therefore an object of the present disclosure to provide a method for measuring the transient thermal diffusion performance of a heat dissipation module using a specific and data-based measurement technology.

It is a further object to use the above-mentioned method for measuring the transient thermal diffusion performance of the heat dissipation module to further provide a user with specific measurement results so that the user can determine a positive or negative heat dissipation effect of the heat dissipation module being measured.

To achieve the above-mentioned objects, the present disclosure provides a method for measuring the transient heat dissipation performance of a heat dissipation module having the steps A through D as set forth below.

In step A, a first measurement point and second measurement point are determined by defining the surface of the heat dissipation module for abutting a heat source as a heat conductive surface; defining a center point of the area of the heat conductive surface abutting the heat source as a heat center point; defining a rectangle on the heat conductive surface centered on the heat center point, with the length and width of the rectangle not exceeding the edge of the heat conductive surface; and defining the outer side of the rectangle on the heat conductive surface and the edge of the heat conductive surface. In particular, a rectangle is defined on the thermal conductive surface centered on the thermal center point, with the length and width of the rectangle not exceeding the edge of the thermal conductive surface. Also, a first measurement point and a second measurement point are arbitrarily selected between the outside of one side of the rectangle on the thermal conductive surface and the edge of the thermal conductive surface, with the straight-line distance between the first measurement point and that side of the rectangle or the virtual extension line of that side as greater than the straight-line distance between the second measurement point and that side of the rectangle or the virtual extension line of that side, and the distance between the first measurement point and the virtual extension line of that side of the rectangle as greater than the straight-line distance between the second measurement point and the virtual extension line of that side of the rectangle or that edge.

In step B, the temperature of the first measurement point and the second measurement point are measured under a stable heat source by placing the heat dissipation module on the heat source, whereby the heat dissipation module is stabilized when the state of heat dissipation does not change further.

In step C, equations (formulas) are calculated by inserting information on the temperature and distance between the first measurement point and the second measurement point into the first formula, which is the analytical solution of the energy equation, to determine the steady state temperature T1 at the distance X1 of the first measurement point and the steady state temperature T2 at the distance X2 of the second measurement point. The first equation is shown below:

$$\theta(X, \tau) = \frac{\cosh(M - MX)}{M\sinh(M)} - \frac{1}{M^2}e^{-(M^2)\tau} - \sum_{n=1}^{5} \frac{2}{M^2 + \lambda_n^2}\cos(\lambda_n X)) \quad (1)$$

$$e^{-(M^2+\lambda_n^2)\tau} \quad \lambda n = \pi, 2\pi, 3\pi \ldots$$

where $\theta(X, \tau) = \frac{T(t) - Ta}{\left(\frac{Q}{kA}\right)dX}$, $M = \sqrt{\frac{4h}{KD}}dx$, $$X = \frac{x}{L}, dX = X1 - X2, \tau = \frac{\alpha t}{L^2}, \alpha = \frac{\tau L^2}{t};$$

and where M is the heat conduction to heat convection intensity ratio, h is the convective heat transfer coefficient, K is the heat conduction coefficient, D is the characteristic diameter, T is the temperature, t is the time, X is the position, L is the characteristic length, λ is the characteristic value, dx is the distance between the first measurement point and the second measurement point, and X1 is the straight-line distance between the first measurement point and that side of the rectangle or the virtual extension line of that side. After the above calculation using the first equation, further calculations using second and third equations as shown are performed:

$$\theta(X1, \infty) = \frac{\cosh(M - MX1)}{M\sinh(M)} \quad (2)$$

$$\theta(X2, \infty) = \frac{\cosh(M - MX2)}{M\sinh(M)} \quad (3)$$

Using the second and third equations, M can be obtained.

In step D, a value for the thermal diffusivity coefficient α is obtained by inserting the temperature T1 at a moment t1 of the transient state between M and the first measurement point X1 from step C into the first equation. The value for the thermal diffusivity coefficient α is then used to represent the transient thermal diffusivity performance of the heat dissipation module.

In this way, the present disclosure provides a specific and data-based measurement technique that can be used by the industry, and furthermore, the disclosure provides a user with specific measurement results so that the user can judge the thermal performance on the heat dissipation module.

BRIEF DESCRIPTION OF THE DRAWINGS

In order to illustrate the technical features of the present disclosure in detail, the preferred embodiment is illustrated with drawings, wherein.

DETAILED DESCRIPTION OF THE EXEMPLARY EMBODIMENT

In order to illustrate details on the technical features of the present disclosure, the following preferred embodiment is given and illustrated with the accompanying drawings, among others.

Figure 1:
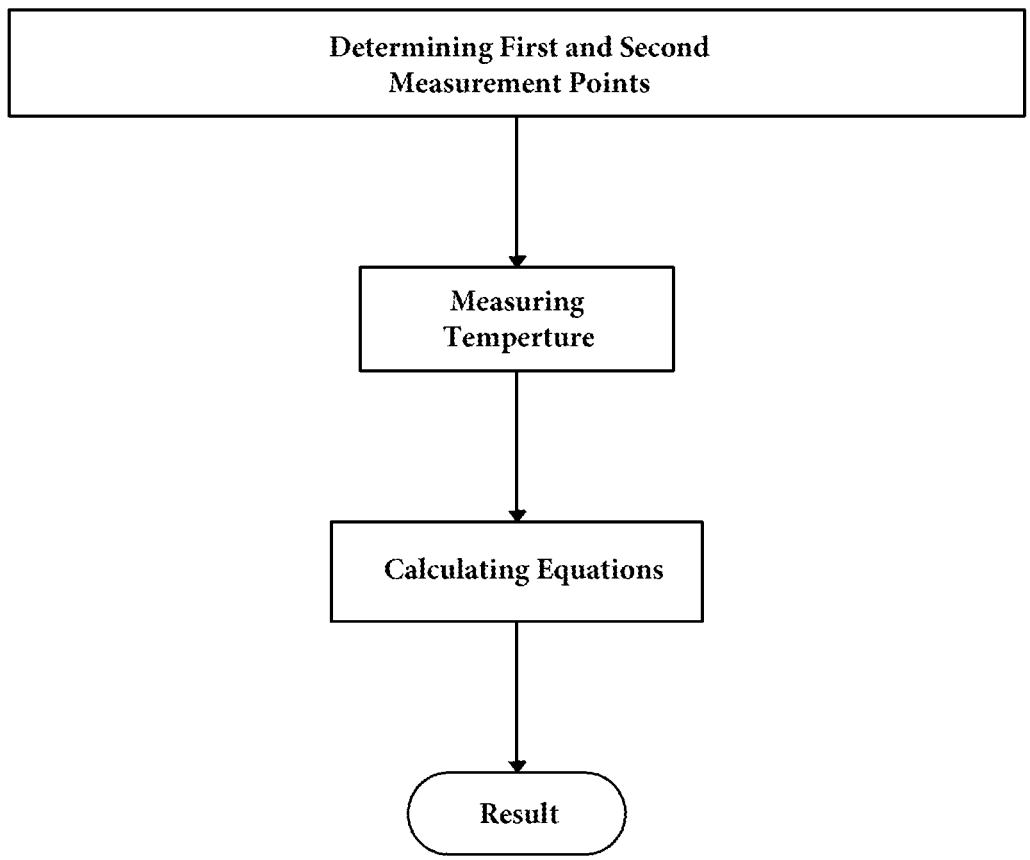
FIG. 1 is a flowchart of a preferred embodiment in the present disclosure.
Figure 2:
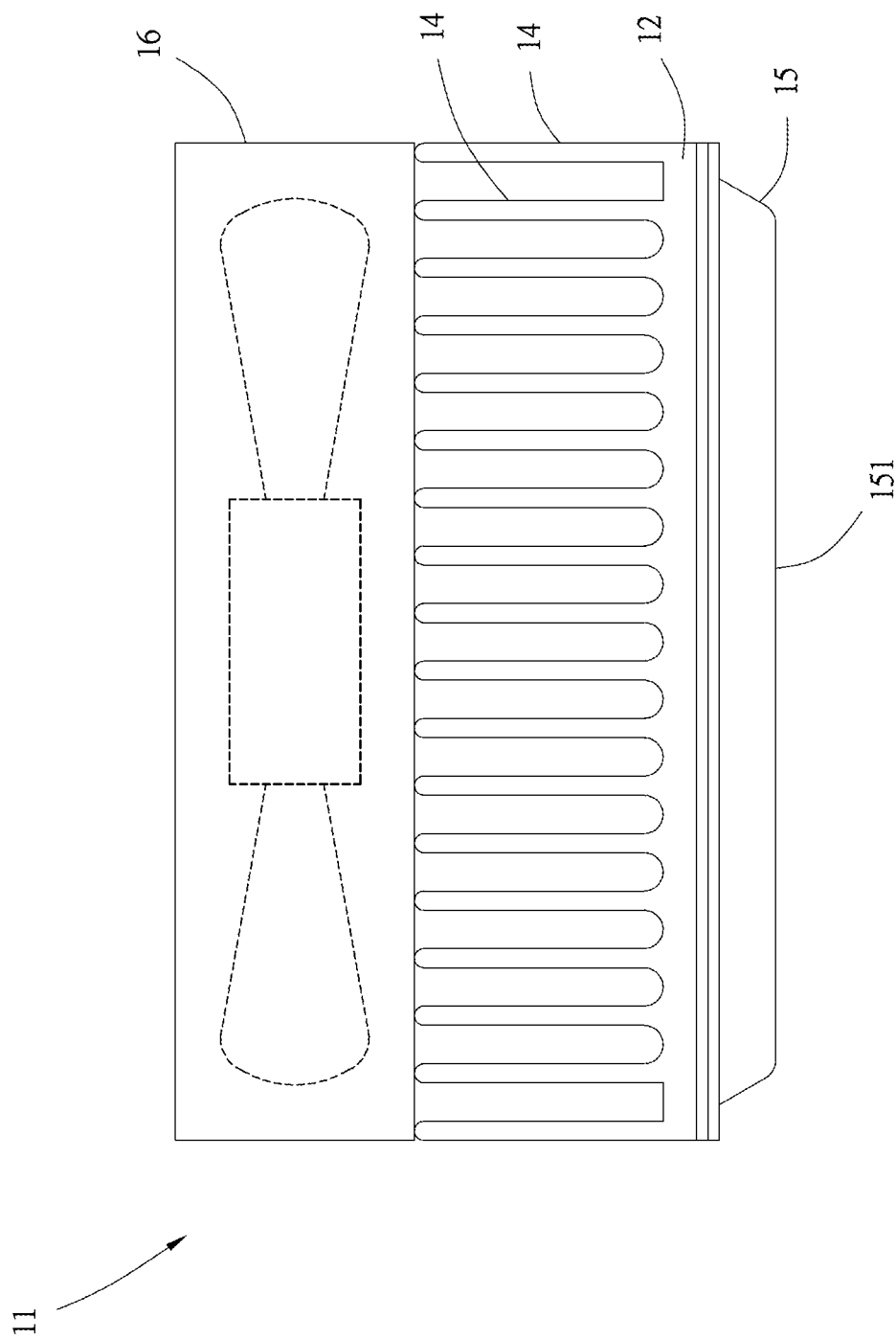
FIG. 2 is a schematic diagram of the assembly of the heat dissipation module according to the preferred embodiment of the present disclosure.
Figure 3:
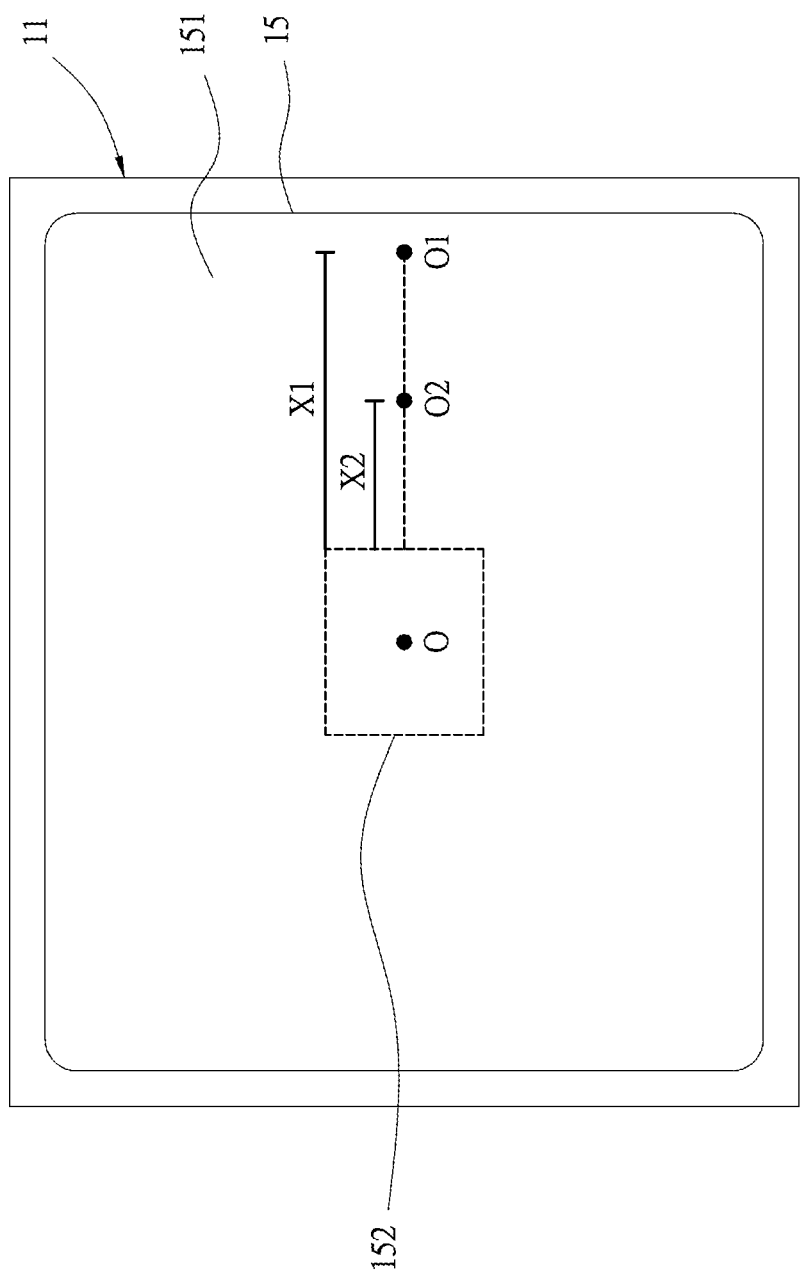
FIG. 3 is a schematic diagram of the bottom surface of the heat dissipation module according to the preferred embodiment of the present disclosure.

As shown in FIGS. 1 to 3, a preferred embodiment of the present disclosure provides a method for measuring the transient heat dissipation performance of a heat dissipation module through the steps as set forth below.

In step A, a first measurement point and a second measurement point are determined. The surface of a heat dissipation module 11, which is affixed to a heat source (not shown) such as a CPU of a computer or an LED chip circuit board, is defined as a thermal conductive surface 151, and in the preferred embodiment, the heat dissipation module 11 has a metal base plate 12 and a plurality of thermal fins 14 extending upwardly from the metal base plate 12. Also in the preferred embodiment, the top surface of a heat sink 15 is affixed to the bottom surface of the metal base plate 12, with the bottom surface of the heat sink 15 being the heat sink surface 151, and the heat dissipation module 11 also has a fan 16 located on the plurality of heat dissipation fins 14. The center point of the area of the heat sink surface 151 is defined as a heat center point O, and a rectangle 152 is defined on the heat sink surface 151 with the heat center point O as the center point. The rectangle 152 has length and width that which do not extend beyond the edge of the thermal conductive surface 151. A first measurement point O1 and a second measurement point O2 are selected between the outside of one side of the rectangle 152 on the thermal conductive surface 151 and the edge of the thermal conductive surface 151, and the distance X1 between the first measurement point O1 and that side of the rectangle 152 is greater than the distance X1 between the second measurement point O2 and that side of the rectangle 152. In addition, in the preferred embodiment, the second measurement point O2 is located on the vertical line between the first measurement point O1 and that side of the rectangle 152, i.e., the second measurement point O2 is linearly related to the first measurement point O1 along its vertical line with that side of the rectangle 152. In addition, in the preferred embodiment, the size of the rectangle 152 is generally the same as the size of the heat source, but such can be smaller or larger in length and width than the length and width of the heat source, and in the case where the rectangle 152 is very small, each side of the rectangle 152 is considered to overlap with the heat center point O.

In step B, the temperature of the first measurement point O1 and the second measurement point O2 are measured under a stable heat source by placing the heat dissipation module 11 on the heat source, whereby the heat dissipation module 11 is stabilized when the state of heat dissipation does not change further.

In step C, information on the temperature and distance between the first measurement point O1 and the second measurement point O2 are inserted into the first formula, which is the analytical solution of the energy equation, to determine the steady state temperature T1 at the distance X1 of the first measurement point O1, and the steady state temperature T2 at the distance X2 of the second measurement point O2. The first equation is shown below:

$$\theta(X, \tau) = \frac{\cosh(M-MX)}{M\sinh(M)} - \frac{1}{M^2}e^{-(M^2)\tau} - \sum_{n=1}^{5}\frac{2}{M^2+\lambda_n^2}\cos(\lambda_n X)) \quad (1)$$

$$e^{-(M^2+\lambda_n^2)\tau} \; \lambda n = \pi, 2\pi, 3\pi ...$$

where $\theta(X, \tau) = \frac{T(t)-Ta}{\left(\frac{Q}{kA}\right)dX}$, $M = \sqrt{\frac{4h}{KD}}dx$, $$X = \frac{x}{L}, dX = X1 - X2, \tau = \frac{\alpha t}{L^2}, \alpha = \frac{\tau L^2}{t};$$

and wherein M is the heat conduction to heat convection intensity ratio, h is the convective heat transfer coefficient, K is the heat conduction coefficient, D is the characteristic diameter, T is the temperature, t is the time, X is the position, L is the characteristic length, λ is the characteristic value, dx is the distance between the first measurement point O1 and the second measurement point O2, X1 is the straight-line distance between the first measurement point O1 and that side of the rectangle 152, and X2 is the straight line distance between the first measurement point O2 and that side of the rectangle 152. After the above calculation using the first equation, further calculations using second and third equations as shown are performed:

$$\theta(X1, \infty) = \frac{\cosh(M - MX1)}{M\sinh(M)} \quad (2)$$

$$\theta(X2, \infty) = \frac{\cosh(M - MX2)}{M \sinh(M)} \quad (3)$$

Using the second and third equations, M can be obtained.

In step D, a value for the thermal diffusivity coefficient α is obtained by inserting the temperature T1 at a certain moment t1 of the transient state from the distance X1 between M and the first measurement point O1 in step C into the first equation. The value of the thermal diffusivity coefficient α is then used to represent the transient thermal diffusivity performance of the heat dissipation module 11.

The steps of the measurement method of the present disclosure are described above, with examples below using actual data.

The temperature of the first measurement point O1=67.5° C. and the temperature of the second measurement point O2=71.5° C. at a certain moment (i.e., steady state) under the condition that the straight-line distance between the first measurement point O1 and that side of the rectangle 152 X1=0.16 m (meters) and the straight-line distance between the second measurement point O2 and that side of the rectangle 152 X2=0.07 m. 71.5° C. The thermal diffusivity coefficient α=1.187 cm²/s is obtained by calculating the above equation, and the thermal diffusivity coefficient α can be used to determine the thermal diffusivity effect of the heat dissipation module 11.

Figure 4:
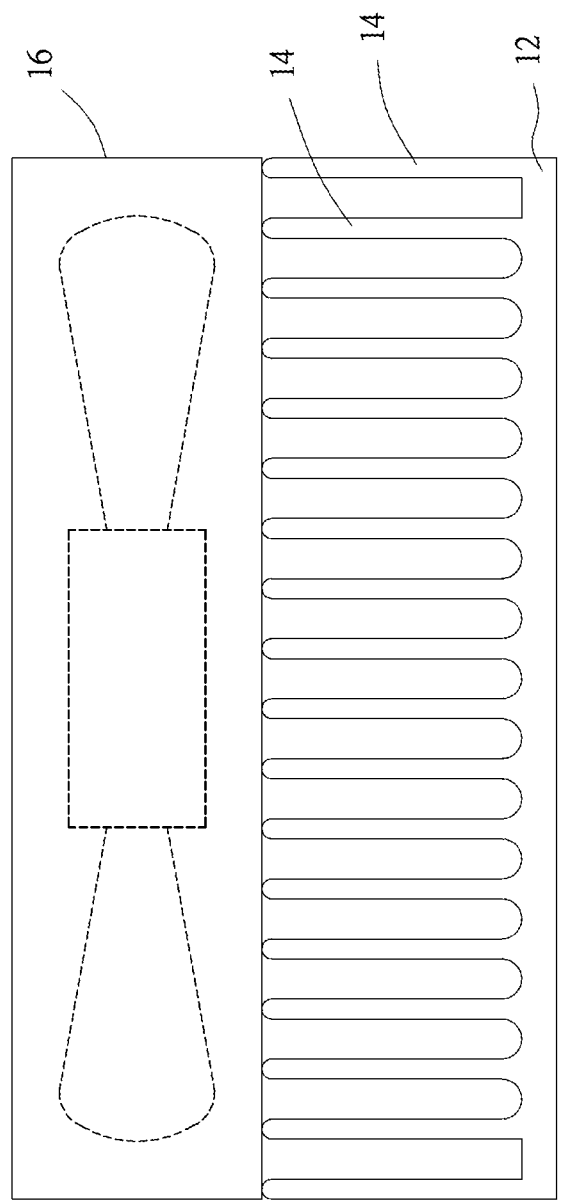
FIG. 4 is a schematic diagram of the assembly of one other heat dissipation module according to the preferred embodiment of the present disclosure.

The aforementioned heat dissipation module 11 is an example of a heat dissipation module with a uniform heat sink 15. However, if the heat dissipation module does not contain a uniform heat sink 15, i.e., it simply has a metal base plate 12 and plural heat sink fins 14, as shown in FIG. 4, the thermal diffusivity coefficient α of the heat dissipation module 11 can be measured using the method of the present disclosure through its bottom surface.

Figure 5:
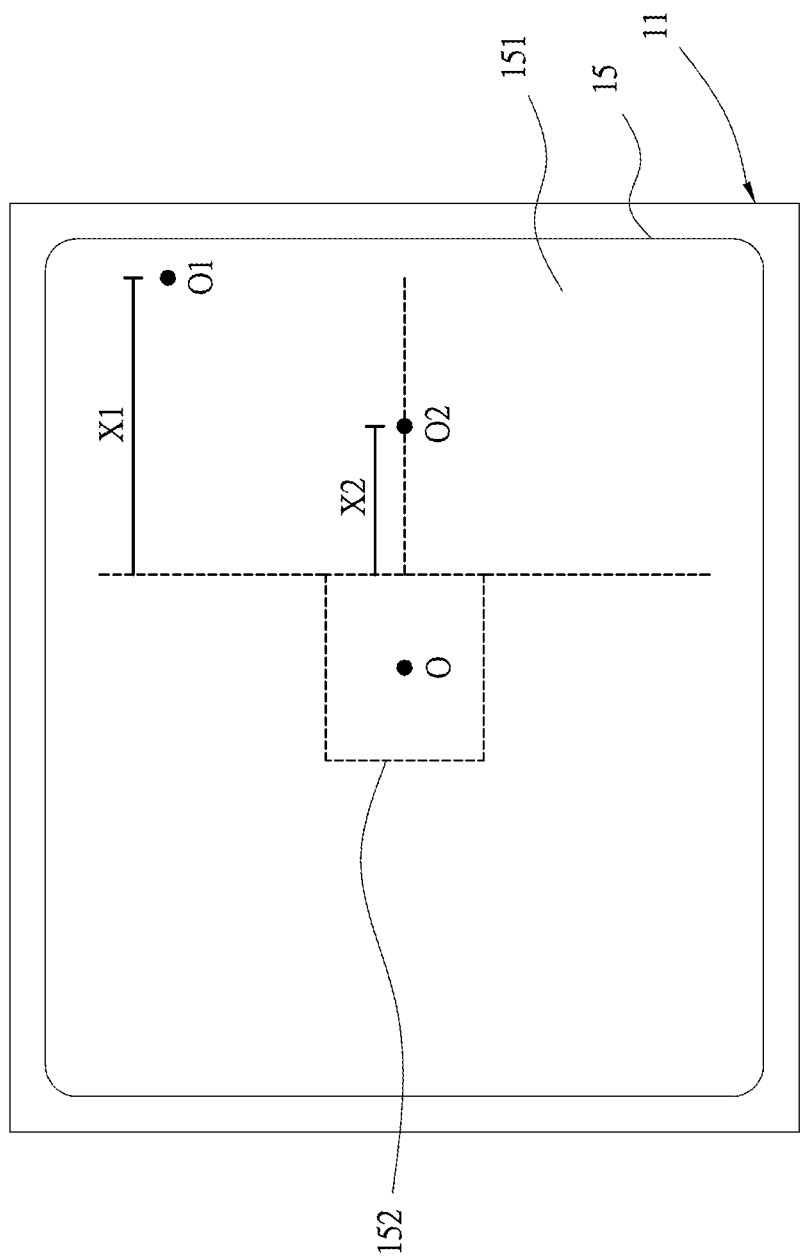
FIG. 5 is a bottom view of the schematic diagram of the one other heat dissipation module according to the preferred embodiment of the present disclosure.

The above description is based on the relationship that the second measurement point O2 is located on the vertical line between the first measurement point O1 and the side of the rectangle 152. However, as shown in FIG. 5, the second measurement point O2 may not be located on the vertical line between the first measurement point O1 and that side of the rectangle 152, and the relationship is non-linear. This is because the method of the present disclosure is mainly based on the straight-line distance between the first measurement point O1 and the second measurement point O2 and that side of the rectangle 152, so even if the relationship is non-linear, it is still capable of performing calculations. For example, as shown in FIG. 5, the first measurement point O1 is located beyond that side of the rectangle 152, so that the vertical connection cannot be intersected on that side, and then a virtual extension line can be obtained by extending that side to form a vertical connection between the first measurement point O1 and the second measurement point O2 and the virtual extension line.

One of the technical features as provided in the present disclosure pertains to the fact that the first measurement point O1 and the second measurement point O2 are both located on the outside of one side of the rectangle 152, that is, on the outside of the same side, so it is a one-dimensional thermal diffusion measurement technology. The technical features of the present disclosure do not cover a situation where the first measurement point O1 is located on the outside of one side of the rectangle 152 and the second measurement point O2 is located on the outside of the other side.

In short, the present disclosure provides a specific and data-based measurement technology that allows the user to have a specific measurement result of, e.g., the heat dissipation coefficient α, so that the user can judge the thermal performance of heat dissipation module 11.

The present disclosure has been described with reference to the preferred embodiment, and such description is not meant to be construed in a limiting sense. It should be understood that the scope of the present disclosure is not limited to the above-mentioned embodiment, but is limited by the accompanying claims. It is, therefore, contemplated that the appended claims will cover all modifications that fall within the true scope of the present disclosure. Without departing from the object and spirit of the present disclosure, various modifications to the embodiments are possible, but they remain within the scope of the present disclosure, will be apparent to persons skilled in the art.

What is claimed is:

1. A method for measuring a transient thermal diffusivity performance of a heat dissipation module, comprising the steps of:
   (a) determining a first measurement point and a second measurement point by defining a surface of the heat dissipation module to which a heat source is attached as a thermal conductive surface, defining a center area of the thermal conductive surface to which the heat source is attached as a thermal center point, and defining a rectangle on the thermal conductive surface centered on the thermal center point with the length and width of the rectangle not exceeding an edge of the thermal conductive surface; and selecting the first measurement point and the second measurement point between a side of the rectangle on the thermal conductive surface and the edge of the thermal conductive surface, with a first straight-line distance X1 between the first measurement point and the side of the rectangle or a virtual extension line of the side being greater than a second straight-line distance X2 between the second measurement point and the side of the rectangle or the virtual extension line of the side;
   (b) under a stable heat generation of the heat source for which a heat dissipation state of the heat dissipation module is steady and no longer changes, separately measuring over a period of time t a steady-state temperature T1 of the first measurement point and a steady-state temperature T2 of the second measurement point by attaching the heat dissipation module to the heat source;
   (c) calculating a first equation by inserting temperature and distance information between the first measurement point and the second measurement point into the first equation in that the steady-state temperature T1 at the first measurement point and the steady-state temperature T2 at the second measurement point are used in the first equation,
wherein the first equation is shown below:

$$\theta(X, \tau) = \frac{\cosh(M - MX)}{M\sinh(M)} - \frac{1}{M^2}e^{-(M^2)\tau} - \sum_{n=1}^{5} \frac{2}{M^2 + \lambda_n^2}\cos(\lambda_n X)) \quad (1)$$

$$e^{-(M^2+\lambda_n^2)\tau} \lambda n = \pi, 2\pi, 3\pi \ldots$$

$$\text{with } \theta(X, \tau) = \frac{T(t) - Ta}{\left(\frac{Q}{kA}\right)dX}, M = \sqrt{\frac{4h}{KD}}dx,$$

-continued $$X = \frac{x}{L}, dX = X1 - X2, \tau = \frac{\alpha t}{L^2}, \text{ and } \alpha = \frac{\tau L^2}{t},$$

wherein M is a heat conduction to heat convection intensity ratio, t is the time, X is a corresponding straight-line distance ratio between the first straight-line distance X1 or the second distance X2 to L, L is the length of the rectangle, α is a thermal diffusivity coefficient, and λ is a correlated value of π, and the following second and third equations are calculated for obtaining M:

$$\theta(X1, \infty) = \frac{\cosh(M - MX1)}{M\sinh(M)} \quad (2)$$

$$\theta(X2, \infty) = \frac{\cosh(M - MX2)}{M\sinh(M)} \quad (3)$$

and (d) obtaining the thermal diffusivity coefficient α by calculating the first equation with the M, the temperature T1, and X1, which is used to represent the transient thermal diffusivity performance of the heat dissipation module.

2. The method for measuring the transient thermal diffusivity performance of the heat dissipation module according to claim 1, wherein the second measurement point is located at a vertical line between the first measurement point, the side of the rectangle, or the virtual extension line of the side.

3. The method for measuring the transient thermal diffusivity performance of the heat dissipation module according to claim 1, wherein the second measurement point is not located at a vertical line between the first measurement point, the side of the rectangle, or the virtual extension line of the side.

4. The method for measuring the transient thermal diffusivity performance of the heat dissipation module according to claim 1, wherein the heat dissipation module has a metal base plate and a plurality of heat dissipation fins, with a bottom surface of the metal base plate being used as the thermal conductive surface.

5. The method for measuring the transient thermal diffusivity performance of the heat dissipation module according to claim 1, wherein the heat dissipation module has a metal base plate and a plurality of heat dissipation fins, and has a uniform temperature thermal conductive plate with a top surface of the uniform temperature thermal conductive plate affixed to a bottom surface of the metal base plate, and the bottom surface of the uniform temperature thermal conductive plate is used as the thermal conductive surface.

* * * * *